G. W. NORTH.
BALING PRESS.
APPLICATION FILED JUNE 2, 1916.

1,229,126.

Patented June 5, 1917.
10 SHEETS—SHEET 2.

Fig. 2.

Witnesses
Edwin J. Beller
R. J. McWhinney

Inventor
George W. North,
by F. E. Hunter.
Attorney.

G. W. NORTH.
BALING PRESS.
APPLICATION FILED JUNE 2, 1916.

1,229,126.

Patented June 5, 1917.
10 SHEETS—SHEET 10.

Witnesses
Edwin J. Beller.
R. J. Mawhinney.

Inventor
George W. North,
by F. E. Hunter
Attorney

UNITED STATES PATENT OFFICE.

GEORGE W. NORTH, OF LA TUNA, TEXAS, ASSIGNOR OF ONE-HALF TO H. M. ANDREAS, OF EL PASO, TEXAS.

BALING-PRESS.

1,229,126.

Specification of Letters Patent.

Patented June 5, 1917.

Application filed June 2, 1916. Serial No. 101,394.

*To all whom it may concern:*

Be it known that I, GEORGE W. NORTH, a citizen of the United States, residing at La Tuna, in the county of El Paso and State of Texas, have invented certain new and useful Improvements in Baling-Presses; and I do hereby declare the following to be a full, clear, and exact description of the invention, such as will enable other skilled in the art to which it appertains to make and use the same.

The present invention relates to improvements in baling presses, and it consists in improvements in the compressor, feeder, and plunger-actuating mechanisms shown and described in my similarly entitled co-pending application Serial No. 35,944, filed June 23, 1915; and furthermore resides in providing an improved tying mechanism to be operated automatically from the movable parts of the press.

More specifically the present invention has for an object to provide a cam-actuated compressor associated with the feed hopper, which is arranged in the usual position above the baling chamber to receive the hay or other material to be baled; also to provide a feeder operating mechanism set in motion immediately following upon the closing of the compressor and grouped to be actuated from the same movable parts; and to further provide an improved mechanism for advancing and retracting the plunger through the baling chamber, such retracting mechanism being out of engagement during the advance movement.

In the accompanying drawing forming a part of this application, and in which similar reference symbols indicate corresponding parts in the several views:

Fig. 17 is a fragmentary perspective view of the tripping device for the tying mechanism.

Fig. 18 is a perspective view of an indicator and alarm employed in conjunction with the tying mechanism.

Figure 5:
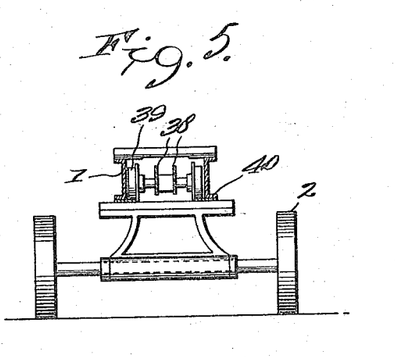
Fig. 5 is a similar view taken on the line 5—5 in Fig. 3.
Figure 6:
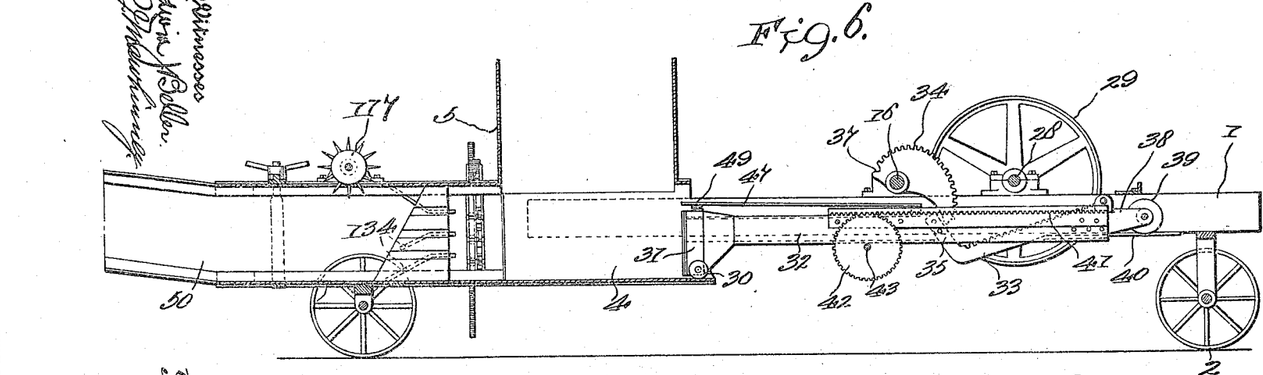
Fig. 6 is a longitudinal central sectional view of the improved baling press.

Referring more particularly to the drawings, and for the present to Figs. 1 to 10 inclusive, 1 designates generally a framework supported for transportation on wheels 2 and having built therein a trunk or barrel 3, in the forward portion of which is, as more particularly seen in Fig. 6, a baling chamber 4.

Figure 7:
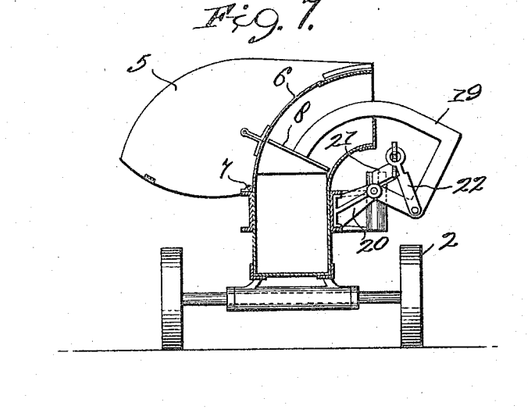
Fig. 7 is a transverse sectional view taken through the hopper and baling chamber, and illustrating the compressor as closed and the feeder in substantially half advanced position.
Figure 8:
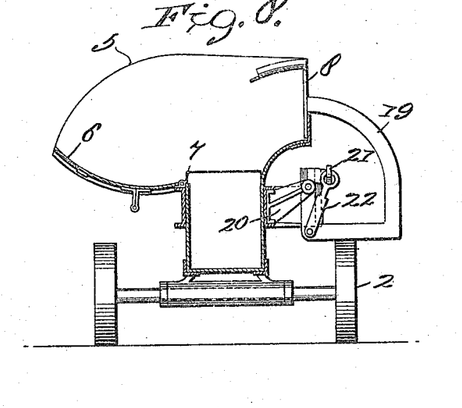
Fig. 8 is a similar view illustrating the compressor as open and the feeder retracted.
Figure 9:
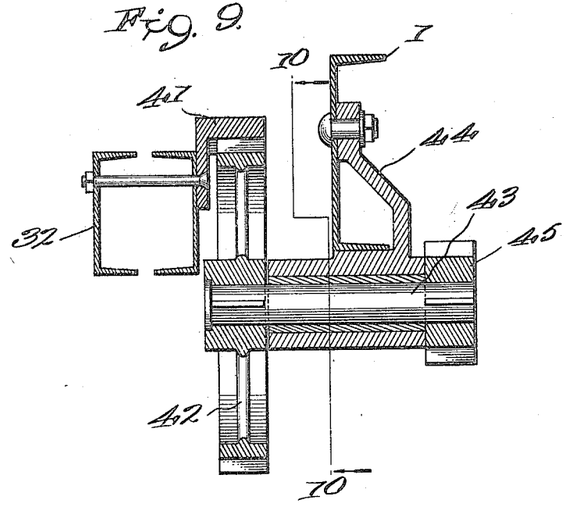
Fig. 9 is a cross sectional view through the plunger returning mechanism.
Figure 10:
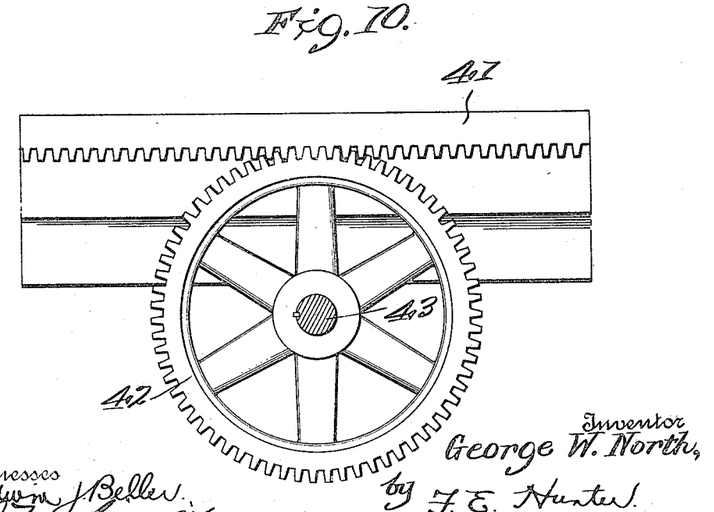
Fig. 10 is a sectional view taken on the line 10—10 in Fig. 9.

Above the baling chamber 4 is arranged a hopper 5 into which the hay or other material to be baled is thrown, and which is received on a door or compressor 6 when in the open position shown in Fig. 8; such compressor 6 being hinged, as indicated at 7, to permit the same to swing upwardly to the position shown in Fig. 7, thereby forcing the hay or other material previously received into the throat of the hopper 5, through which travels a feeder or presser-foot 8, for which see Figs. 7 and 8.

Figure 2:
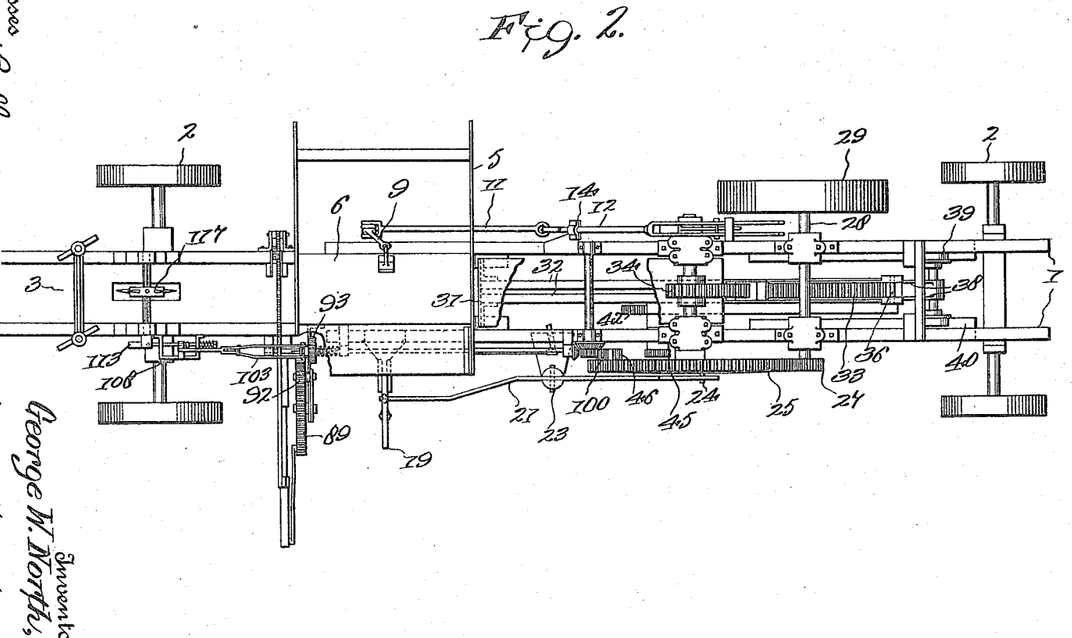
Fig. 2 is a top plan view of the same.
Figure 3:
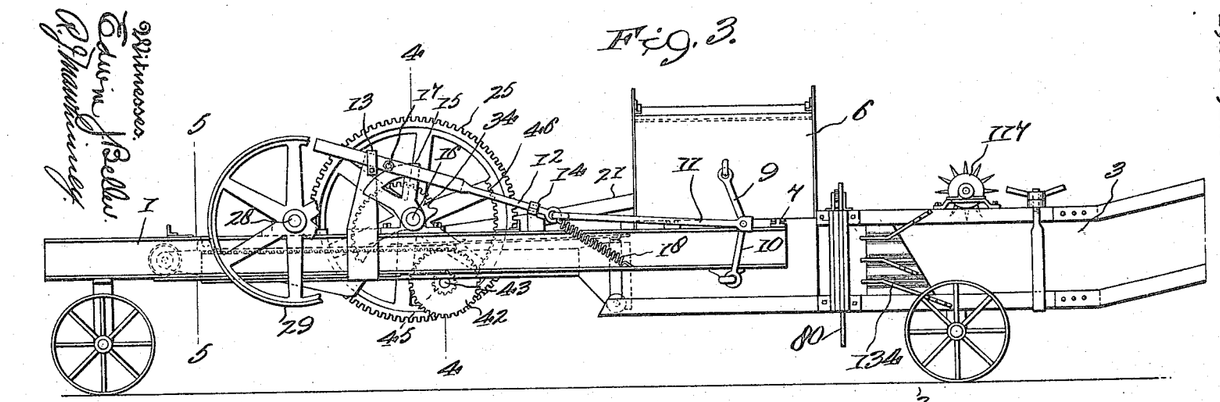
Fig. 3 is a side elevational view, parts being broken away, of the improved press taken from the side opposite that shown in Fig. 1.
Figure 4:
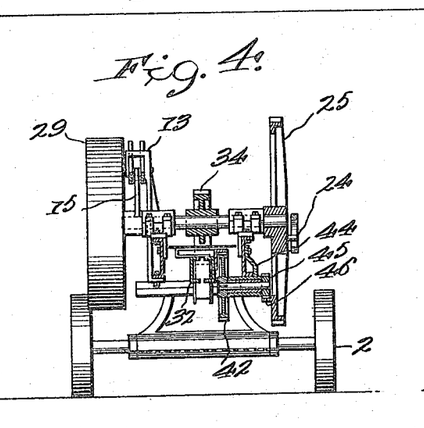
Fig. 4 is a transverse sectional view taken on the line 4—4 in Fig. 3.

In describing the mechanism for actuating the compressor 6, reference is to be had to Figs. 2 and 3, where the respective members of a toggle joint 9, 10, are shown connected to such compressor 6 and the framework 1. To the toggle center is coupled one end of a link 11, joined at its opposite end to a bifurcated bar 12 fitted to slide through bearings 13 and 14 secured in any suitable manner to the machine framing. Through the bifurcated portion of the bar 12 is disposed to operate a cam 15 on a driven shaft 16; and extending across such bifurcated portion of the sliding bar 12 and into the path of the cam 15, so as to be engaged thereby, is a bolt 17.

During the interval that the cam 15 is out of engagement with the bolt 17 the sliding bar 12 and link 11 are drawn to a rearward position in a manner to break the toggle joint 9, 10, thereby lowering the compressor door 6 to the position shown in Fig. 8, such action being automatically accomplished preferably through a coil spring 18 secured advantageously at the joint between the bar 12 and link 11 and framework 1 of the machine.

Figure 1:
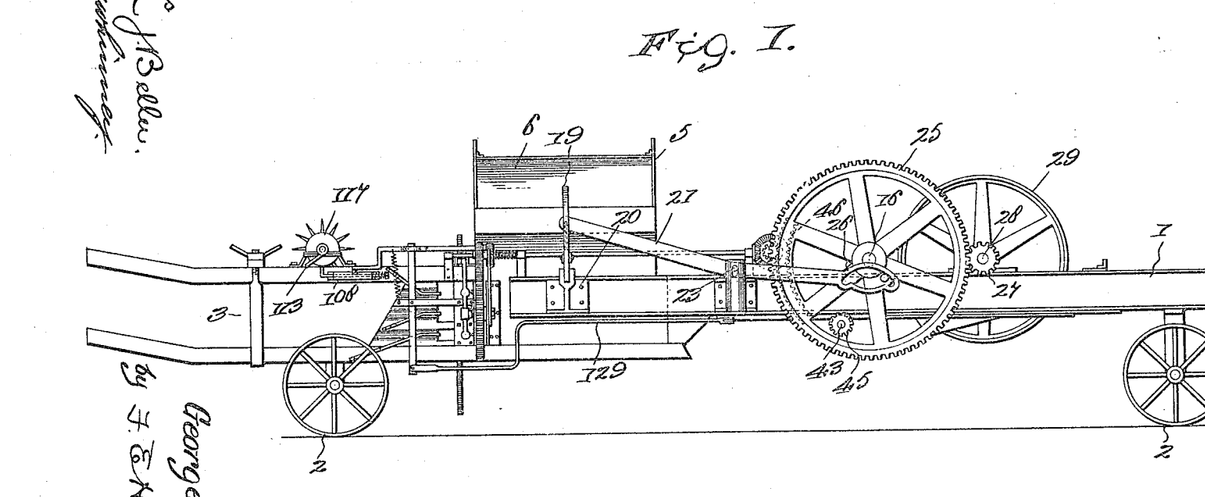
Fig. 1 is a side elevational view of an improved baling press constructed in accordance with the present invention.

Now returning to Figs. 7 and 8 and considering in connection therewith Figs. 1 and 2, the feeder or compressor-foot is seen to be carried on the free end of a bent arm 19 mounted to pivot about a bracket 20 supported from the framework. Between the arm 19 and one end of a lever 21 is connected a link 22 for operating the arm and foot 8, as will more particularly hereinafter appear.

The lever 21 is fulcrumed, as indicated at 23, to a spring bracket fixed to the framework, and such lever 21 is preferably, in the present instance, actuated from a crank pin 24 on a gear wheel 25 operating in a cam slot 26 formed in the opposite end of the lever.

The gear wheel 25 is mounted on a driven shaft 16, and is in mesh with a pinion 27 on a drive shaft 28 to which is fixed a pulley 29. The pulley 29 is adapted to receive a belt (not shown) from a traction engine, by means of which the baling press may be drawn along on the wheels 2, or from other source of power.

Fitted to travel on rollers 30 in the baling chamber 4 is a plunger 31, connected to be reciprocated therein from a plunger-rod 32. The plunger-rod 32 is advantageously constituted of a pair of channel beams assembled with their flanges directed inwardly, as more particularly shown in Fig. 4, and may be bolted or secured together in any suitable manner. At their rear ends the channel beams, constituting the plunger-rod 32, receive therebetween an inclined rack 33, for coöperating with a cam gear 34 mounted on the driven shaft 16 for advancing the plunger 31 to compress the charge of hay or other material previously delivered to the baling chamber 4.

At its rear and lower end the rack 33 is bent upwardly to provide an inclined wall 35, extending at substantially right angles to said rack and provided to be encountered by one end of the cam gear 24, as shown in Fig. 6, at the beginning of the advance stroke. The last tooth of the rack 33 is constituted by a pin or roller 36 coöperating with an enlarged notch 37 in the cam gear 34, for increasing the power at the end of the plunger stroke and for facilitating the disengagement of the cam gear 34 from the rack 33 upon completion of the plunger stroke.

The plunger-rod 32 is, at its forward end, provided with ears 38, in which are journaled rollers 39 traveling on a track 40, illustrated in Figs. 5 and 6 to be supported from the framework 1.

To the plunger rod 32 is secured an overhanging rack 41 continuously in mesh with a gear wheel 42 on a shaft 43. This shaft 43 is supported in the framework 1 by a hanger 44, and is provided with a fixed pinion 45 adapted to mesh with a segmental rack 46 formed on the gear wheel 25.

As will be apparent from the various positions of the parts shown in the drawings, the segmental rack 46 will be disengaged from the pinion 45 during the advance stroke of the plunger 31. When, however, the cam gear 34 has disengaged the inclined rack 33, leaving the plunger 31 in its advanced position, the segmental rack 46 is so relatively disposed as to thereupon engage the pinion 45, and as the gear wheel 25 rotates farther will transmit, through the shaft 43, gear wheel 42 and rack 41, the necessary forward motion to the plunger-rod 32 to retract the plunger 31 to the initial position shown in Fig. 6, where the latter is in readiness to receive the next actuation. Immediately upon return of the plunger to initial position, the rack 46 is of a length to then leave the pinion 45 free, and such pinion may be rotated reversely through the shaft 43 and gear wheel 42 from the overhanging rack 41 when the plunger 31 is being advanced from the cam gear 34.

Extending above the plunger 31 and rod 32 is a false bottom 47 secured in any suitable manner at its rear to the rod 32, and having its forward end yieldingly supported by a coil or other spring 49. This bottom 47 prevents the entrance of material through the throat of the hopper 5 and into the mechanism behind the plunger 31, so as to clog the same or interfere with its free operation.

The operation of the present invention may be described as follows:

Having been drawn along by traction power or draft animals to the required location, the pulley 29 is engaged with a belt from the power source, or other agency supplied to drive either the shaft 28 or the shaft 16, it being immaterial to my present invention whence and in what manner the power may be derived and applied.

With the power applied, the parts are moved to the initial position with the plunger 31 retired, as in Fig. 6, and the compressor door 6 in the lowered position shown in Fig. 8, the presser-foot being also retracted, as here shown. The operator now throws the hay or other material to be baled into the hopper 5, where it is received upon the compressor door 6. After sufficient material has been loaded into the hopper 5, the machine is set in motion from the power source, and the drive shaft 28 revolving, will, through the pinion 27 and gear wheel 25, transmit rotary motion to the driven shaft 16, upon which is fitted the cam 15, as clearly shown in Fig. 3.

The cam 15 moving with the driven shaft 16 will first engage the bolt 17 and force the sliding bar 12 forwardly through the brackets 13 and 14 and against the influence of the coil spring 18. This position is substantially shown in Fig. 3, where the sliding bar 12 has been moved, correspondingly drawing upon the link 11 and operating the toggle joint 9, 10, to raise the compressor door 6 from the lowered position shown in Fig. 8 to the elevated position illustrated in Fig. 7. By this movement the material previously placed in the hopper 5 will be deposited in the throat thereof and in the path of the presser-foot 8, which, as indicated in Fig. 7, will be subsequently driven down through its actuating mechanism to force the material from the throat of the hopper into the baling chamber 4, where it will be subsequently compressed by the plunger 31.

The presser-foot 8 is actuated from the pin 24 on the gear wheel 25 which operates in the cam slot 26. When moving to the lower position shown in Fig. 1, the pin 24 carries therewith the connected end of the lever 21, rocking the same about the fulcrum 23 and elevating the opposed end to which the bent arm 19, carrying the presser-foot 8, is connected through the link 22. The presser-foot 8, after descending to drive the material into the bailing chamber 4, will at least be withdrawn sufficiently from the bailing chamber 4 to permit the passage of the plunger 31 before the mechanism of the latter is put so far in motion as to cause interference between these two coacting agencies.

Following upon the delivery of the material to the baling chamber by the action of the presser-foot 8, the cam gear 34 will move to engage the inclined wall 35 on the rack 33 and put the plunger rod 32 in motion. The plunger 31 and rod 32 will be moved but a short distance before the teeth on the cam gear 34 will come to engage the corresponding teeth on the inclined rack 33, and by such engagement the motion of the plunger will be continued, increased power being obtained as the cam gear 34 rotates. By this means the plunger 31 will be moved to its advanced stroke in the baling chamber 4, forcing before it the material introduced therein and compressing such material in the trunk 3. As set out more fully in my co-pending application aforesaid, by the use of such a cam gear as shown at 34, the compressing power of the plunger 31 will be increased toward the end of its stroke, where it encounters the greatest opposition and where it is necessary that the highest compression take place.

At any stage of the cycle of operations after the material has been introduced into the baling chamber 4, the compressor door 6 may be returned to the lower position shown in Fig. 8, in readiness to receive the next load of hay; and from the size of the segmental cam 15, illustrated in Fig. 3, it will be apparent that the door 6 is only closed for a short period, necessary for confining the hay in the throat of the hopper 5 while the presser-foot 8 is traversing the same. By having the compressor door 6 returned at an early stage, the operator will have ample time to deposit subsequent loads within the hopper 5 without requiring the machinery to be stopped at each repetition of the cycle of operations.

After having advanced the plunger 31 and disengaged the cam gear from the rack 33, the gear wheel 25 will now bring the segmental rack 46 to engage the pinion 45 on the shaft 43. Continued rotation of the gear wheel 25 will now transmit a rotary motion through the pinion 45 to the shaft 43 and to the gear wheel 42, which is in mesh with the overhanging rack 41 on the plunger rod 32. The motion thus derived will be in a reverse direction to that developed from the cam gear 34, and will consequently operate to return the plunger 31 to its initial position shown in Fig. 6, where it will be in readiness for the next advance actuation.

When this function of returning the plunger 31 to initial position has been accomplished, the rack 46 will move to disengage the pinion 45 and leave the latter and its shaft 43 to be rotated in a counter-clockwise direction, as impelled by the advance motion of the plunger 31.

The above described cycle of operations is repeated, the baled material being delivered through a throat or chute 50, and being bound into bales by mechanism to be hereinafter more fully described.

Referring now more particularly to Figs. 11 to 18 inclusive, wherein the improved tying mechanism is illustrated, 60 designates the carriage, including a plurality of tubular rods 61 fitted to slide through hollow sleeves 62 projecting from a framework 63 secured as by the bolts shown, or other means, to the trunk or barrel 3.

The inner ends of the tubular rods 61 are threaded to removably receive the threaded ends of needles 64 having undercut notches 65. As disclosed to advantage in Figs. 14 and 15, the needles 64 project substantially centrally between arms 66 and 67 forming part of a yoke 68 supported from the inner ends of the tubular rods 61; such arms 66 and 67 carrying rollers 69 and 70 over which is passed the tying wire which is designated at 71. Associated with one or more of the rollers 69, 70, there may be pins 72, or other devices, for engaging with the opposite side of the tie wire 71, and thereby secure the same against possible displacement from the roller.

The tie wires 71 may be of any suitable number to correspond with the number of needles 64 and associated arms 66 and 67 employed, and may be carried on reels on a separate frame; or such reels of wire may be journaled on the framework of the press, as commonly done in this art, and which will be understood without further illustration.

Figure 11:
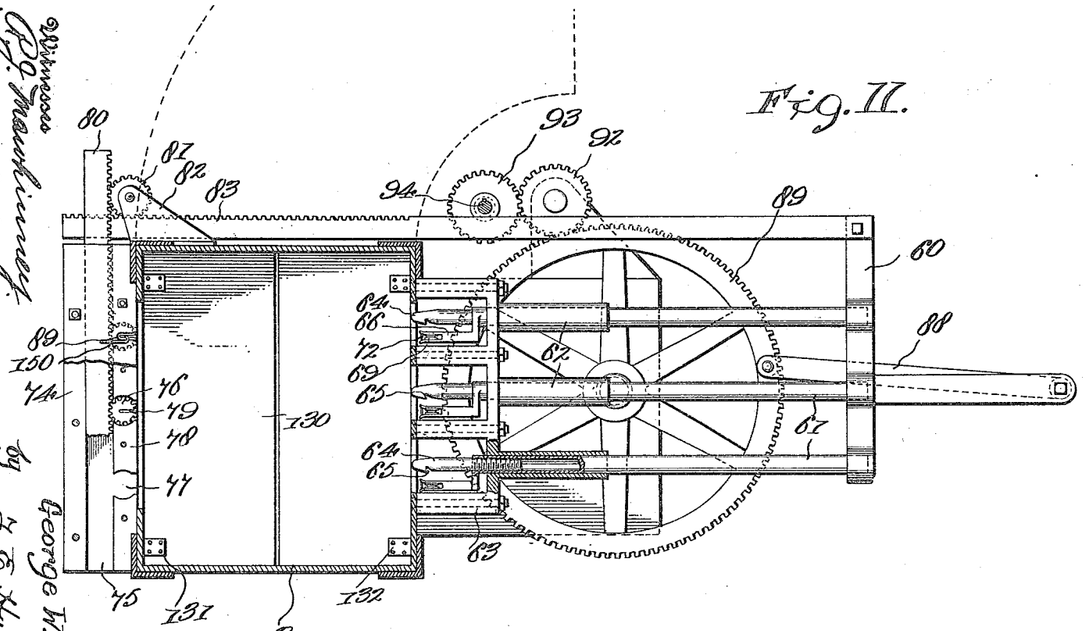
Fig. 11 is a transverse sectional view through the trunk of the press and illustrating the tying mechanism partly in section and partly in elevation.

From the reels the wire 71 is received and passed through eyes 73 having flared mouths for facilitating insertion therethrough. On the side of the trunk 3 transversely opposite to the frame 63 supporting the needle carriage, is a casing 74 divided centrally by a partition 75 providing a vertical compartment for receiving the twisting wheels 76, which, as more clearly appear from Fig. 11, are journaled in sockets 77 formed between strips 78 bolted or otherwise secured to the casing 74.

The twisting wheels 76 are provided with the usual radial slots 79, between which the doubled ends of the tie wires are received and revolved to twist the same together when the wheels are put in motion. The wheels 76 are formed with teeth to engage a vertically reciprocating rack 80, slidable through the frame 74 and in engagement to be actuated from a pinion 81 journaled in ears 82 projecting from the top of the barrel 3. The gear wheel 81 is of a width to extend beyond the rack 80, where it also meshes with a horizontally reciprocating rack 83, carried by and receiving its movement from the needle carriage 60. It will therefore be seen that when the carriage 60 is put in motion to convey the tie wires 71 across the trunk 3 after a bale has been completely formed, by moving the rack 83 therewith will operate to rotate the pinion 81 and communicate motion to the rack 80 and twisting wheels 76.

Figure 14:
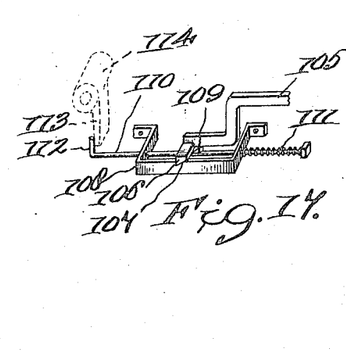
Fig. 14 is a horizontal sectional view illustrating the tying mechanism in initial position.
Figures 14, 15, 16:
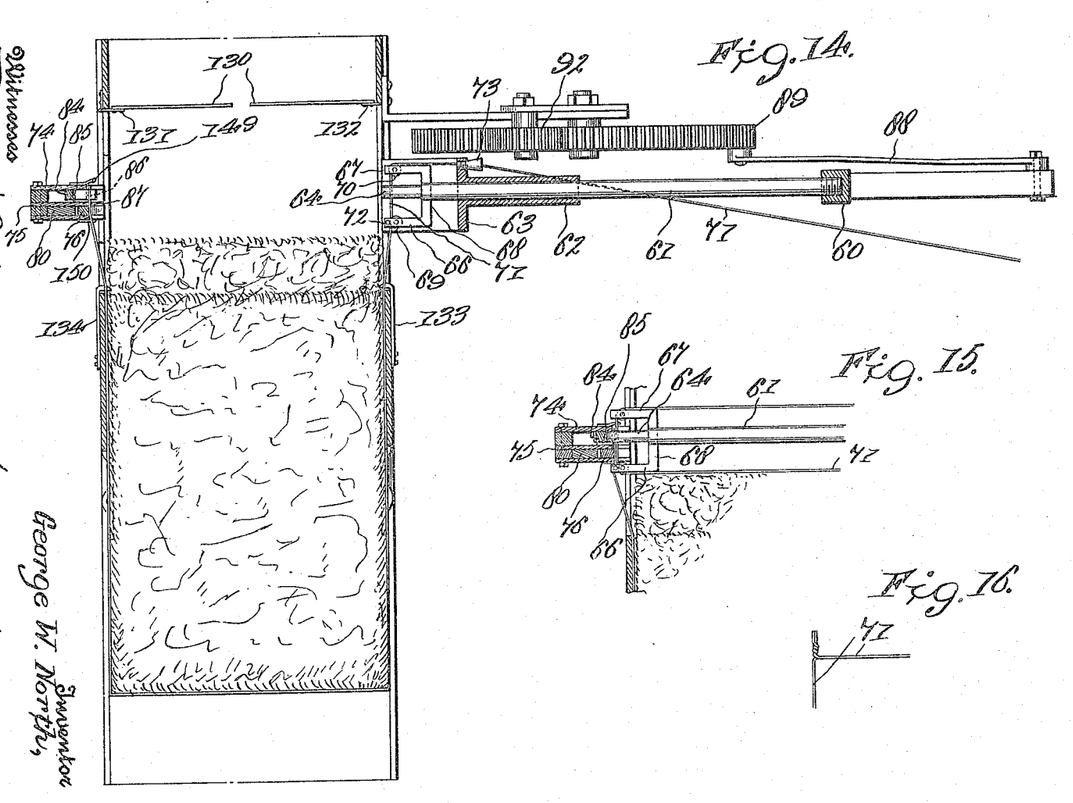
Fig. 15 is a fragmentary view of a corner of Fig. 14, indicating the advanced position of the tying mechanism.
Fig. 16 illustrates the ends of the bale wires after being twisted by the tying mechanism.

In the compartment of the casing 74, to the other side of partition 75, are fitted a series of pivoted dogs 84 and cutters 85 adapted to operate in conjunction with the needles 64, whereby the tie wires 71 will be caught in said dogs in substantially the manner indicated at 86 in Fig. 14, and will be severed by the cutters 85 at the point indicated at 87.

The carriage 60 is adapted to be reciprocated across the trunk 3 by movement derived through a link 88 from a gear wheel 89 supported on a shaft 90 in a bracket 91 secured to the trunk 3, or other part of the framework of the press. Meshing with the gear wheel 89 is a pinion 92, which may also be carried in any suitable manner on the framework of the press, and which is adapted to mesh with a companion pinion 93 slidably mounted on a shaft 94, and mounted to slide thereon as by a key and groove, or other arrangement. The shaft 94 is journaled to rotate in bearings 95, and has on its forward end a bevel pinion 96 continuously in mesh with a similar pinion 97 fitted on a shaft 98. On the said shaft 98 is also mounted a spur pinion 99 adapted to mesh with a segmental rack 100 formed on the gear wheel 25 opposite to the internal segmental rack 46.

A coil spring 101 is wound about the shaft 95 between the adjacent bearing 95 and the slidable pinion 93, and operating to move said slidable pinion 93 into mesh with the companion pinion 92; and for purposes of facilitating the engagement of such pinions, the teeth thereon may be suitably rounded off.

Figure 12:
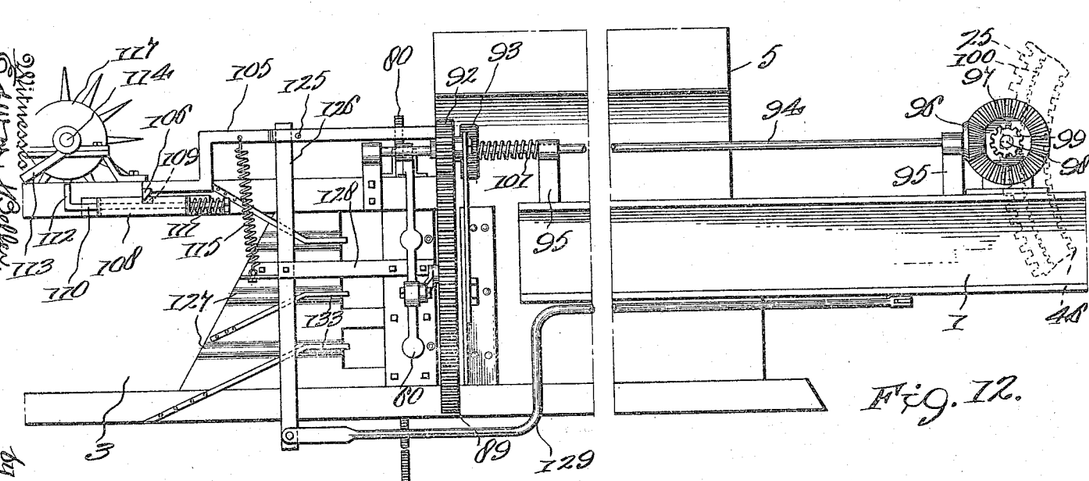
Fig. 12 is a side elevational view of such tying mechanism.

The pinion 93 is formed with, or secured to a collar 102, pivotally connected to the bifurcated ends 103 and 104 of an arm 105. At its opposite end the arm is bent, as indicated in Fig. 12, and carries a bevel block 106 adapted to occupy a correspondingly formed notch 107 in a U-shaped bracket 108 secured to the press framework, and engageable by a beveled lug 109 on a reciprocating latch rod 110. With the latch rod 110 is associated a coil spring 111 for normally tending to move said latch rod to disengage the lug 109 from the bevel block 106. At its opposite end the latch rod 110 has its extremity turned upwardly to provide an abutment 112 to be encountered by a projection 113 on a rotating shaft 114.

Figure 13:
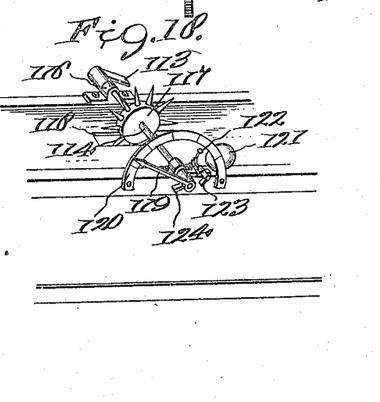
Fig. 13 is a top plan view, partly in section thereof.

A coil spring 115 is connected between the arm 105 and the press framework, and acts to draw the arm downwardly to engage the bevel block 106 with the notch 107 in the bracket 108, whereby the collar 102 and shiftable pinion 93 are held in the position shown in Figs. 12 and 13 of the drawings, wherein said pinion 93 is out of mesh with the companion pinion 92. When the bale is formed in the trunk 3, however, the projection 113 will be so timed as to thereupon encounter the abutment 112 and move the latch rod 110, against the influence of its spring 111, to engage the lug 109 with the bevel block 106, thereby raising the free end of the arm 105 about its pivotal connection with the collar 102 and in opposition to the spring 115. When the arm 105 is thus raised, the beveled block 106 is thereby disengaged from the notch 107 in the bracket 108, thus releasing the slidable pinion 93 to the action of the coil spring 101, which immediately moves such pinion along the shaft 94 and into mesh with the companion pinion 92. When pinions 92 and 93 are thus in mesh, and the external segmental rack 100 on the gear wheel 25 meshes and rotates with the pinion 99, through the bevel gear wheels 96 and 97, rotation will be imparted to the shaft 94 which will rotate the slidable pinion 93, transmitting rotation to the companion pinion 92 and to the gear wheel 89, which will reciprocate the carriage 60.

The shaft 114 carrying the projection 113 is journaled in brackets 116 on the trunk 3, and supports a toothed wheel 117 projecting through a slot 118 in said trunk to be engaged by the baled material which is pushed through the trunk by the action of the plunger. When the baled hay passes through the trunk and engages with the teeth of the wheel 117, the shaft 114 will be rotated, and the parts will be so proportioned that a sufficient amount of material to form a bale of predetermined size will pass and actuate the wheel 117 through one complete revolution, the projection 113 being thereby rotated to actuate the latch tripping mechanism and releasing the slidable pinion 93 to permit engagement of the same with the companion pinion 92, completing the chain of transmission through which the carriage 60 is reciprocated.

Referring to Fig. 18, on that end of the shaft 114 opposite to the projection 113, is fitted an index or pointer 119 arranged to move over a segment 120, constituting an indicator in plain view to apprise the operator approximately when a sufficient amount of material has been deposited in the hopper to form a complete bale. Associated with this indicating mechanism there may also advantageously be an audible alarm, including a bell 121 sounded by a hammer 122 actuated by coöperating lugs 123 and 124, the latter being disposed to rotate with the shaft 114.

Passing through the bifurcated ends 103 and 104 of the arm 105, is a pin or bolt 125 which is adapted to confine one end of a lever 126 fulcrumed at 127 on an arm 128. The lower end of the lever 126 connects with a curved link 129 coupled to a pivoted latch 130, projecting into the path of the plunger or plunger rod and adapted to be struck thereby on its return stroke to move said arm rearwardly, rocking the lever 126, which will swing the arm 105 forwardly, carrying the pinion 93 out of mesh with the pinion 92 and restoring the bevel block 106 into confinement in the notch 107 in the bracket 108. The transmission connecting the carriage 60 with the movable parts of the press will thus be disengaged, and the plunger may be operated through a sufficient number of strokes to form a subsequent bale before the toothed wheel 117 will execute a complete revolution to again bring the projection 113 to engage the abutment 112 and trip the latch 110.

There are preferably doors 130 hinged as indicated at 131 and 132, and with which are associated springs for normally moving the doors to the position shown in Fig. 14. These doors 130 are opened by the action of the plunger forcing the material therethrough, and automatically return to position through their springs after the plunger has retired. They thus provide a clearance space for the free movement of the needle carriage 60.

Dogs 133, 134, in any suitable number, are provided to extend within the trunk 3 and engage the baled material after being forced therethrough by the plunger, and to prevent the expansion of such baled material so as to enter and clog the space through which the needle carriage 60 must pass.

Figure 19:
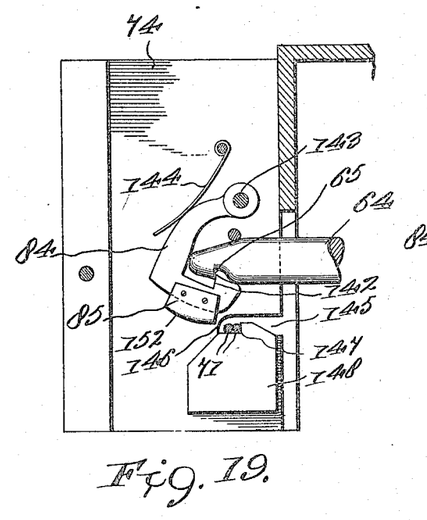
Fig. 19 is an enlarged sectional view through the wire holding and cutting device, showing the same in the retracted position.
Figure 20:
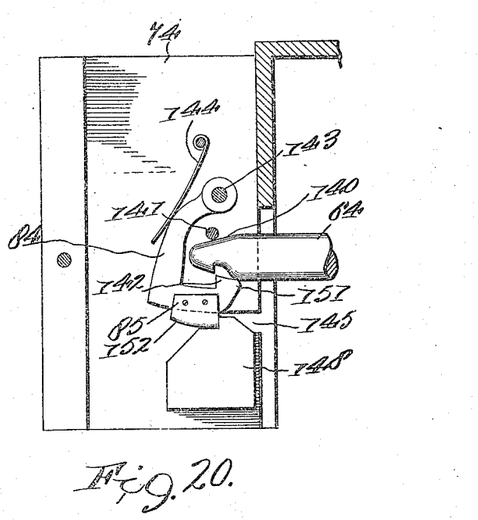
Fig. 20 is a similar view illustrating the parts in the forward position.
Figure 21:
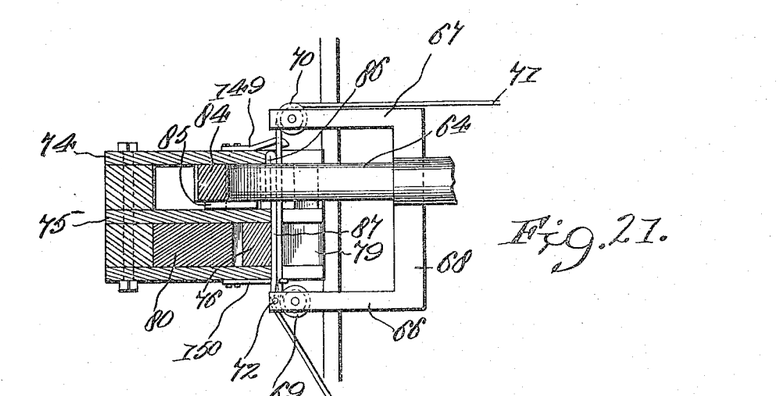
Fig. 21 is an enlarged cross sectional view through the twisting and cutting mechanism.

The operation of the needles 64 and dogs 84 will be apparent from an inspection of Figs. 19 to 21 inclusive. Here the needles 64 are shown with inclined upper ends 140 for encountering rods 141, whereby the free ends of such needles 64 are directed downwardly in the manner illustrated in Fig. 19 to engage the undercut notches 65 with shoulders 142 on the dogs 84. These dogs, as illustrated in Figs. 19 and 20, are pivoted at 143, and are automatically pressed forward to the position shown in Fig. 20 by flat or other springs 144. The ends of the needles 64 engage the dogs 84 on the forward movement, pushing said dogs backward, as indicated in Fig. 19, in opposition to the springs 144. When thus pushed back the dogs 84 do not obstruct the slots 145 in the walls of the casing 74, through which the tie wires 71 are passed by the arms 66 and 67. The rear walls of the slots 145 are curved, as at 146, to guide the tie wires 71 into seats 147, provided in blocks 148 to receive the same.

As indicated in Figs. 11 and 21, to either side of the casing 74 are secured catches 149 and 150, which are preferably of resilient material, so as to yield when the tie wires are pushed into the slots 145 and to thereupon snap upon the latter, holding the same therein when the yoke 68 and needles 64 are withdrawn. As the needles 64 are withdrawn, the notches 65 engaging the shoulders 142 will draw therewith the dogs 84 from the position shown in Fig. 19 to substantially that shown in Fig. 20, thus bringing said dogs into engagement to bind the tie wires 71. This movement is also assisted by the springs 144. Toward the end of this forward movement of the dogs 84, cams 151 thereon will engage with the needles 64, pushing the same upwardly, and thereby disengaging the notches 65 from the shoulders 142.

The needles 64 are thus entirely freed from engagement with the dogs 84, and may consequently be withdrawn and returned to the opposite side of the trunk 3, as shown in Fig. 14. When the needles 64 are disengaged and retracted from dogs 84, the springs 144 act to force the dogs 84 forwardly to the position shown in Fig. 20, where such dogs will close upon the wires 71, securely holding them in position, and at the same time severing such wires by a knife edge 152 carried by the dogs.

The operation of the invention will be clear from the foregoing description, it being understood that the various coacting mechanisms operate automatically and that the press may be operated and tended to by a single workman.

I claim:

1. In a baling press, the combination of a baling chamber, a plunger adapted to travel in said baling chamber, a rack associated with said plunger and having an angularly-disposed forward end, and a rotating cam gear adapted to strike the angular end of said rack to start the plunger on its advance stroke, and to mesh with said rack to carry the plunger through the remainder of the advance stroke, substantially as described.

2. In a baling press, the combination of a baling chamber, a plunger fitted to operate in said baling chamber, an inclined rack associated with said plunger and having a forward angularly projecting end, and a rotating cam gear adapted to strike the angular end of said inclined rack, and to mesh with said rack to drive the plunger through its advance motion, substantially as described.

3. In a baling press, the combination of a baling chamber, a plunger arranged to operate in said baling chamber, an inclined rack associated with said plunger and having a forwardly and angularly-disposed end, a roller supported at the rear end of said inclined rack, and a rotating cam gear adapted to strike the angular end of said rack and to mesh with the same, said cam gear having a notch therein for receiving the roller at the end of said rack, substantially as described.

4. In a baling press, the combination of a baling chamber, a plunger fitted to travel in said baling chamber, a rod connected to said plunger and including a pair of longitudinally-extending sections secured together, an inclined rack clamped between the sections of said plunger rod, a rotating cam gear adapted to mesh with said inclined rack for driving the plunger through its advance motion, and means for returning said plunger to initial position, substantially as described.

5. In a baling press, the combination of a baling chamber, a plunger fitted to travel in said baling chamber, a rod connected to said plunger and including a pair of longitudinally-extending members assembled together, an inclined rack embraced between the members of said plunger rod and having a forward angularly-disposed end thereon, a roller carried by the rear end of said inclined rack, a rotating cam gear having a notch therein adapted to engage said roller and arranged to strike the angular end of said inclined rack and to mesh with the same to drive the plunger through its advance motion, and means for returning the plunger to initial position after each advance actuation, substantially as described.

6. In a baling press, the combination of a baling chamber, a plunger traveling in said chamber, means for advancing said plunger, including a rotating shaft, mechanism actuated from said rotating shaft for driving the plunger forward, and means for returning said plunger to initial position, including a rack connected to move with said plunger, a gear wheel meshing with said rack, a pinion fixed to rotate with said gear wheel, and a gear segment supported from said shaft and arranged to encounter and rotate said pinion, substantially as described.

7. In a baling press, the combination of a baling chamber, a plunger fitted to travel in said baling chamber, a rod connected to said plunger, a rotating shaft, a gear element on said rotating shaft, means on said shaft for engaging with said rod to advance the plunger, a rack on said plunger rod, a gear wheel meshing with said rack, a pinion fixed to rotate with said gear wheel, and a segmental rack supported from said gear element and adapted to encounter and rotate said pinion to return the plunger, substantially as described.

8. In a baling press, the combination of a baling chamber, a plunger fitted to reciprocate in said baling chamber, a rod connected to said plunger, an inclined rack carried by said rod, a rotating shaft, a cam gear on said rotating shaft and adapted to mesh with said inclined rack to drive the plunger forward, a straight rack on said plunger rod, a gear wheel meshing with said straight rack, a pinion fixed to rotate with said gear wheel, and a gear segment adapted to encounter and rotate said pinion to return the plunger after each actuation, substantially as described.

9. In a baling press, the combination of a baling chamber, a plunger traveling in said baling chamber, a plunger rod connected to said plunger, a driving shaft, a driven shaft, gear connections between said shafts, a cam gear on said driven shaft, an inclined rack carried by said plunger rod for engagement by said cam gear to advance the plunger, a straight rack carried by said plunger rod, a gear wheel continuously in mesh with said straight rack, a pinion fixed to rotate with said gear wheel, and a gear segment carried by one of said gear elements and arranged to periodically mesh with and rotate said pinion to return the plunger to initial position after each advance actuation, substantially as described.

10. In a baling press, the combination of a wheeled frame, a trunk attached to said frame, wheels supporting said trunk, a baling chamber formed in said trunk, a hopper for introducing material to said baling chamber, a plunger fitted to travel in said baling chamber, rollers for said plunger, a rod connected to said plunger, a spring-pressed false bottom for the hopper carried by said plunger and rod, tracks on said framework, rollers on said plunger rod traveling over said tracks, an inclined rack carried by said plunger, a rotating cam gear adapted to mesh with said rack to drive the plunger through its forward movement, a second rack carried by said plunger rod, a gear wheel meshing with said second-named rack, and means for intermittently driving said second-named gear wheels for returning the plunger, substantially as described.

11. In a baling press, the combination of a framework, a trunk connected to said framework, wheels supporting said framework and trunk, a baling chamber formed in said trunk, a hopper for delivering material to said baling chamber, a plunger fitted to travel in said baling chamber, a rod connected to drive said plunger, a spring-pressed false bottom for the hopper carried by said plunger and rod, tracks on said framework, rollers attached to said rod and traveling over said tracks, an inclined rack carried by said plunger, and having a forwardly and angularly-disposed end, a rotating cam gear for meshing with said inclined rack and adapted to engage the angularly-disposed end thereof to start the plunger through its advance movement, a second rack carried by said plunger rod, a gear wheel continuously in mesh with said rack, a pinion connected to rotate with said gear wheel, and a rotating gear segment adapted to intermittently encounter and rotate said pinion to impart return motion to said plunger, substantially as described.

12. In a baling press, the combination of a baling chamber, a plunger mounted in said baling chamber, means for actuating said plunger, a hopper for introducing material to said baling chamber, a compressor associated with said hopper, means for operating said compressor, including a toggle mechanism, spring means for normally breaking said toggle mechanism to maintain the compressor in open position, and a rotating cam for operating said toggle mechanism against the influence of said spring means to close said compressor, substantially as described.

13. In a baling press, the combination of a baling chamber, a plunger fitted in said baling chamber, means for actuating said plunger, a hopper for delivering material to said baling chamber, a compressor door for said hopper, means for actuating said compressor door, including a toggle mechanism, a bifurcated rod coupled to said toggle mechanism, spring means for normally breaking said toggle mechanism to maintain the door in open position, a projection extending between the arms of said bifurcated rod, and a rotating cam for engaging said projection to move the toggle against the opposition of said spring means whereby to close the compressor door, substantially as described.

14. In a baling press, the combination of a baling chamber, a plunger in said baling chamber, means for actuating said plunger, a hopper for delivering material to said baling chamber, a feeder adapted to travel through said hopper, a bent arm carrying said feeder, a lever having a cam slot in one end thereof, a rotating projection engaging through said cam slot to oscillate said lever, and a link connecting said lever and bent arm, substantially as described.

15. In a baling press, the combination of a baling chamber, a plunger in said baling chamber, means for actuating said plunger, a hopper for delivering material to said baling chamber, a feeder foot traveling through said hopper, a pivotally-mounted bent arm carrying said foot, a lever having a cam slot therein, a spring bracket for supporting said lever, a rotating projection adapted to occupy said cam slot to oscillate said lever, and a link connected between said lever and bent arm for actuating the latter from the former, substantially as described.

16. In a baling press, the combination of a baling chamber, a plunger traveling in said baling chamber, means for actuating said plunger, a hopper for introducing material to said baling chamber, a compresser door associated with said hopper, a toggle mechanism connected to said door, spring means for normally breaking the toggle mechanism to maintain the door open, a rotating cam for intermittently closing the door against said spring means, a feeder foot adapted to travel through said hopper, a bent arm carrying said feeder foot, a lever having a cam slot therein, a rotating projection occupying said cam slot for oscillating the lever, and a link connected between said lever and bent arm, substantially as described.

17. In a baling press, the combination of a baling chamber, a plunger therein, means for actuating said plunger, a hopper for delivering material to said baling chamber, a compressor door associated with said hopper, a toggle mechanism for actuating said door, a rod connected to said toggle mechanism, spring means for normally breaking said toggle mechanism to hold the door open, a projection on said rod, a rotating cam adapted to encounter said projection and move the toggle mechanism to close the door, a feeder foot adapted to travel through said hopper only when said door is closed, a bent arm carrying said foot, a lever, a spring bracket supporting said lever, said lever having a cam slot therein, a rotating pin engaging through said cam slot and oscillating the lever, and a link connected between said bent arm and lever, substantially as described.

18. In a baling press, the combination of a baling chamber, a plunger traveling in said chamber, a rod connected to said plunger, an inclined rack carried by said rod, a rotating cam gear for engaging with said inclined rack to advance the plunger, gear means for returning said plunger to initial position, a hopper for delivering material to the baling chamber, a movable door associated with said hopper, a toggle mechanism for actuating said door to close, a feeder for traveling through the hopper when said door is closed, a lever connected to actuate said feeder, and means for oscillating said lever, substantially as described.

19. In a baling press, the combination of a baling chamber, a plunger in said chamber, a rod connected to said plunger, an inclined rack carried by said plunger, a rotating cam gear for periodically meshing with said inclined rack to advance the plunger, a second rack carried by said rod, a gear wheel continuously in mesh with said rack, means for intermittently imparting motion to said gear wheel to return the plunger to initial position, a hopper for delivering material to said baling chamber, a compressor door associated with said hopper, a toggle mechanism to open the door, a rotating cam for intermittently closing said hopper door, a feeder adapted to travel through said hopper when the door is closed, a bent arm carrying said feeder, a lever connected to said bent arm, and means for oscillating said lever, substantially as described.

20. In a baling press, the combination of a trunk providing a baling chamber, means for introducing material to said baling chamber, mechanism for compressing the material into said trunk, and tying mechanism including a carriage mounted to reciprocate across said trunk, a yoke on said carriage, arms forming part of said yoke, means supported on said arms for receiving the tying wire, a notched needle mounted on said carriage, a casing at one side of said trunk, twisters in said casing for receiving the tying wire, a dog in said casing for engagement by said notched needle and to hold the tying wire, and a cutter for severing the wire, substantially as described.

21. In a baling press, the combination of a trunk providing a baling chamber, mechanism for compressing the material from said baling chamber through said trunk, and a tying mechanism including a carriage, means for driving said carriage across said trunk, arms supported on said carriage, rollers on said arms for receiving the tying wire, a notched needle, a casing on one side of said trunk for receiving said carriage, twisters in said casing for engaging the tying wire, means for operating said twisters, a dog in said casing for engagement to be operated by said notched needle for holding the tying wire, and a cutter mounted in said casing between the twisters and dog for severing the tying wire, substantially as described.

22. In a baling press, the combination of a trunk providing a baling chamber, mechanism operating in said baling chamber for compressing the material into said trunk, swinging doors mounted in said trunk, means for returning the doors to position extending across said trunk after the material has been driven therethrough, a tying mechanism situated in rear of said doors, and dogs extending into said trunk for holding the material against expansion back into the clearance space in rear of said doors, substantially as described.

23. In a baling press, the combination of a trunk, tying mechanism inculding a carriage movable across said trunk, a rack supported to move with said carriage, a pinion meshing with said rack, a second rack meshing with said pinion and driven thereby, twisters having teeth engaging said rack, and means on said carriage for engaging the tie wires and carrying the same into said twisters, substantially as described.

24. In a baling press, the combination of a trunk for receiving the baled material, a carriage movable across said trunk including a plurality of rods, a frame secured to said trunk, sleeves on said frame for slidably receiving said rods, means on said carriage for engaging a plurality of tie wires and carrying the same across said trunk, and twisters for receiving said wires adapted to be operated from said carriage, substantially as described.

25. In a baling press, the combination of a trunk for receiving the baled material, a carriage movable across said trunk, a plurality of rods forming part of said carriage, a frame secured to said trunk, sleeves on said frame for slidably receiving said rods, means carried by said rods for engaging a plurality of tie wires and carrying the same across said trunk, a plurality of twisters for receiving said tie wires, a rack meshing to rotate said twisters, a pinion meshing with said rack, and a second rack movable with said carriage and in engagement with said pinion, substantially as described.

26. In a baling press, the combination of a trunk for receiving the baled material, a carriage movable across said trunk and including a plurality of rods, notched needles carried by said rods, arms on said rods for engaging the tie wires, twisters for receiving the tie wires from said arms, a rack meshing with said twisters to rotate same, a pinion meshing with said rack, and a second rack movable with said carriage for engaging said pinion, dogs actuated by said notched needles for holding the tie wires, and cutters for severing the tie wires, substantially as described.

27. In a baling press, the combination of a trunk providing a baling chamber, means for introducing material to said baling chamber, a plunger fitted in said baling chamber and adapted to compress the material into said trunk, a tying mechanism including a carriage movable across said trunk, means supported on said carriage for conveying the tie wires, twisters for receiving said tie wires, means connected to be actuated from said carriage for rotating said twisters, and means for reciprocating said carriage including disengageable gear elements, means for automatically engaging said elements, means for normally holding said elements disengaged, a tripping device for releasing said last-named means, and means for restoring said tripping device to normal position, substantially as described.

28. In a baling press, the combination of a trunk providing a baling chamber, means for introducing material to said baling chamber, mechanism for compressing the material into said trunk, a tying mechanism including a carriage movable across said trunk, notched needles on said carriage, means on said carriage for engaging and conveying the tie wires, twisters for receiving said tie wires, means for actuating said twisters from said carriage, movable dogs for engaging and holding the tie wires and adapted to be actuated by said notched needles, and means for reciprocating said carriage including disengageable gear elements, means for tending to engage said elements, means for holding said elements disengaged, a tripping device for releasing said last-named means, a lever associated with said tripping device for restoring the same to initial position, and automatic means for rocking said lever, substantially as described.

29. In a baling press, the combination of a trunk providing a baling chamber, means for introducing material to said chamber, mechanism in said baling chamber for compressing the material into said trunk, movable doors in said trunk, spring means associated with said doors for returning the same to position extending across said trunk after the material has been driven therethrough, a tying mechanism in rear of said doors and including a shiftable carriage, means on said carriage for engaging and conveying the tie wires, twisters for receiving the tie wires, means operable from said carriage for rotating said twisters, means for driving said carriage intermittently, and dogs projecting into said trunk in rear of said tying mechanism for preventing expansion of the compressed material, substantially as described.

30. In a baling press, the combination of a trunk providing a baling chamber, means for introducing material to said baling chamber, means for compressing the material into said trunk, a carriage traversable across said trunk for carrying the tie wires, needles having notches therein supported on said carriage, casings at the opposite side of said trunk, dogs for holding the tie wires having shoulders for engaging with the notches in said needles, and cutters carried by said dogs for severing the tie wires, substantially as described.

31. In a baling press, the combination of a trunk providing a baling chamber, means for introducing material to said chamber, means for compressing the material into said trunk, a carriage traversable across said trunk, needles supported on said carriage and having inclined upper ends and notches therein, a casing on the opposite side of said trunk, pivoted dogs in said casing having shoulders for engaging the notches in said needles, rods in said casing for engaging the inclined ends of said needles to guide the notches into said shoulders, cutters carried by said dogs for severing the wire, springs associated with said dogs, and cams on said dogs for engaging the needles to move the same upwardly and disengage the shoulders and notches, substantially as described.

In testimony whereof, I affix my signature.

GEO. W. NORTH.

Copies of this patent may be obtained for five cents each, by addressing the "Commissioner of Patents, Washington, D. C."